(12) United States Patent
Howard et al.

(10) Patent No.: US 12,045,686 B2
(45) Date of Patent: Jul. 23, 2024

(54) FIXED RETAIL SCANNER WITH MULTI-PORT NETWORK SWITCH AND RELATED METHODS

(71) Applicant: Datalogic USA, Inc., Eugene, OR (US)

(72) Inventors: Brett Howard, Eugene, OR (US); Ryan Thompson, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 0 days.

(21) Appl. No.: 18/071,594

(22) Filed: Nov. 29, 2022

(65) Prior Publication Data

US 2023/0206205 A1 Jun. 29, 2023

Related U.S. Application Data

(60) Provisional application No. 63/311,789, filed on Feb. 18, 2022, provisional application No. 63/293,563, filed on Dec. 23, 2021.

(51) Int. Cl.
*G06Q 20/20* (2012.01)
*G06K 7/10* (2006.01)
(Continued)

(52) U.S. Cl.
CPC ....... *G06K 7/10831* (2013.01); *G06Q 20/208* (2013.01); *H04N 1/00931* (2013.01); *H04N 1/02865* (2013.01)

(58) Field of Classification Search
CPC .......... G06K 7/10831; G06K 7/10732; G06K 7/1096; G06Q 20/208; G06Q 20/202;
(Continued)

(56) References Cited

U.S. PATENT DOCUMENTS

| 7,234,641 B2 | 6/2007 | Olmstead |
| 8,233,040 B2 | 7/2012 | Patel et al. |

(Continued)

FOREIGN PATENT DOCUMENTS

| DE | 19815149.0 A1 | 10/1999 |
| EP | 3 153 923 A1 | 4/2017 |

OTHER PUBLICATIONS

PCT International Foreign Search Report and Written Opinion for PCT/US2022/053712 dated Apr. 5, 2023, 11 pps.

(Continued)

*Primary Examiner* — Toan C Ly
(74) *Attorney, Agent, or Firm* — Foley & Lardner LLP (57) ABSTRACT

The disclosure includes a fixed retail scanner including a data reader comprising a main board, one or more camera modules, and a multi-port network switch disposed within a housing of the data reader. The multi-port network switch is configured to provide a network backbone for at least some internal devices within the housing of the data reader and for at least some external devices positioned external to the housing of the data reader and operably coupled with the data reader through the multi-port network switch. Related systems may include a remote server operably coupled to the fixed retail scanner through the multi-port network switch such that image data to the remote server may be communicated via the multi-port network switch from at least one of the main board or the at least one camera coupled to the multi-port network switch.

20 Claims, 8 Drawing Sheets

(51) Int. Cl.
*H04N 1/00* (2006.01)
*H04N 1/028* (2006.01)

(58) Field of Classification Search
CPC .......... H04N 1/00931; H04N 1/02865; G07G 1/0018; G07G 1/0045
USPC ...................................................... 235/454
See application file for complete search history.

(56) References Cited

U.S. PATENT DOCUMENTS

| | | | |
|---|---|---|---|
| 8,430,318 | B2 | 4/2013 | Mcqueen et al. |
| 8,704,903 | B2 | 4/2014 | McClellan |
| 8,740,086 | B2 | 6/2014 | Handshaw et al. |
| 8,861,664 | B2 | 10/2014 | Akkihal et al. |
| 9,004,359 | B2 | 4/2015 | Shearin et al. |
| 9,048,847 | B2 | 6/2015 | McLaurin et al. |
| 9,305,198 | B2 | 4/2016 | Thompson et al. |
| 9,413,418 | B2 | 8/2016 | Bottazzi et al. |
| 9,870,498 | B2 | 1/2018 | Reynolds et al. |
| 10,049,247 | B2 | 8/2018 | Gao |
| 10,161,742 | B2 | 12/2018 | Patel et al. |
| 10,248,896 | B2 | 4/2019 | Gao et al. |
| 10,326,943 | B2 | 6/2019 | Crooks et al. |
| 11,080,498 | B1 | 8/2021 | Drzymala et al. |
| 11,151,344 | B2 | 10/2021 | Barkan et al. |
| 2003/0001010 | A1 | 1/2003 | Schmidt et al. |
| 2003/0078849 | A1 | 4/2003 | Snyder |
| 2008/0182639 | A1 | 7/2008 | Antonopoulos et al. |
| 2010/0139989 | A1 | 6/2010 | Atwater et al. |
| 2012/0181338 | A1* | 7/2012 | Gao .................. G06K 7/12 235/455 |
| 2013/0020392 | A1 | 1/2013 | Olmstead et al. |
| 2013/0306727 | A1 | 11/2013 | Shearin et al. |
| 2013/0327829 | A1 | 12/2013 | Thompson et al. |
| 2014/0118920 | A1 | 5/2014 | Ng et al. |
| 2017/0037768 | A1 | 2/2017 | Fangauer |
| 2017/0140363 | A1* | 5/2017 | Hicks .................. G06K 7/10297 |
| 2017/0154195 | A1 | 6/2017 | Nahill et al. |
| 2017/0374768 | A1 | 12/2017 | Hughes et al. |
| 2018/0218190 | A1 | 8/2018 | Nadabar |
| 2019/0369252 | A1 | 12/2019 | Girotti |
| 2020/0125812 | A1 | 4/2020 | Canini et al. |
| 2021/0142015 | A1 | 5/2021 | Drzymala et al. |
| 2022/0207969 | A1 | 6/2022 | Howard et al. |
| 2022/0232138 | A1 | 7/2022 | Gao et al. |
| 2023/0269843 | A1 | 8/2023 | Slowik et al. |

OTHER PUBLICATIONS

Datalogic Brochure, "Digimarc Barcode Feature Overview", Datalogic S.p.A., 2014-2019, Oct. 28, 2019, 2 pgs.
Datalogic Brochure, "Fixed Retail Scanners Product Group Guide", Datalogic S.p.A., 2021, Apr. 30, 2021, 8 pgs.
Datalogic Brochure, Magellan 9300i/9400i, Datalogic S.p.A., 2015-2019, Aug. 22, 2019, 2 pgs.
Datalogic Brochure, "Magellan 9800i Advanced Digital Imagine Technology for the Point of Sale", Datalogic S.p.A., 2012-2017, Mar. 21, 2017, 3 pgs.
Datalogic Brochure, "Magellan 9800i Premium bi-optic with market-leading performance for high-throughput scanning", Datalogic S.p. A., 2013-2021, Dec. 10, 2021, 2 pgs.
Product Spec Sheet, "Zebra MP7000 Scanner Scale", Zebra Technologies Corp., Nov. 11, 2019, 4 pgs.
Petkovic, "Software Synchronization of Projector and Camera for Structured Light 3D Body Scanning", Proceedings of the 7th International Conference on 3D Body Scanning Technologies, Lugano, Switzerland, Nov. 30-Dec. 1, 2016, 10 pages.

* cited by examiner

FIXED RETAIL SCANNER WITH MULTI-PORT NETWORK SWITCH AND RELATED METHODS

PRIOR APPLICATIONS

This application claims the benefit of U.S. Provisional Application No. 63/293,563, filed Dec. 23, 2021, and entitled "FIXED RETAIL SCANNER WITH MULTI-PORT NETWORK SWITCH AND RELATED METHODS, the disclosure of which is incorporated by reference herein in its entirety. This application also claims the benefit of U.S. Provisional Application No. 63/311,789, filed Feb. 18, 2022, and entitled "FIXED RETAIL SCANNERS WITH ILLUMINATION ASSEMBLIES HAVING DIFFERENT SUB-GROUPS OF LEDS AND RELATED METHOD," the disclosure of which is incorporated by reference herein in its entirety.

RELATED APPLICATION

This application is also related to U.S. patent Ser. No. 18/071,588 (and which also claims priority to U.S. Provisional Application Nos. 63/293,563 and 63/311,789), filed on the same day as the present application, and entitled "FIXED RETAIL SCANNERS WITH ILLUMINATION ASSEMBLIES HAVING DIFFERENT SUB-GROUPS OF LEDS AND RELATED METHOD," the disclosure of which is incorporated by reference herein in its entirety.

TECHNICAL FIELD

The present disclosure relates generally to scanners or code readers, and more particularly, to fixed retail scanners having a multi-port enabled switch.

BACKGROUND

Data reading devices are used to read optical codes, acquire data, and capture a variety of images. Optical codes typically comprise a pattern of dark elements and light spaces. There are various types of optical codes, including one-dimensional codes, such as a Universal Product Code ("UPC") and EAN/JAN codes, and stacked and two-dimensional codes, such as PDF417 and Maxicode codes. Data reading devices are well known for reading UPC and other types of optical codes on packages, particularly in retail stores. One common data reader in such systems is an imaging reader that employs an imaging device or sensor array, such as a CCD (charge coupled device) or CMOS (complementary metal oxide semiconductor) device. Imaging readers can be configured to read both 1-D and 2-D optical codes, as well as other types of optical codes or symbols and images of other items.

BRIEF SUMMARY

A fixed retail scanner including a data reader comprises a main board including one or more processors disposed within a housing of the data reader, one or more camera modules disposed within a housing of the data reader, and a multi-port network switch disposed within the housing of the data reader and operably coupled with the main board. The multi-port network switch is configured to provide a network backbone for at least some internal devices within the data reader and for at least some external devices positioned external to the housing of the data reader and operably coupled with the data reader through the multi-port network switch.

A data reading system comprises a bioptic scanner and a remote server. The bioptic scanner comprises a main board including one or more processors configured to perform decoding of barcodes and a multi-port network switch that is operably coupled to internal components including the main board and at least one camera disposed within the bioptic scanner. The remote server is operably coupled to the fixed retail scanner through the multi-port network switch. The multi-port network switch is configured to communicate image data to the remote server via at least one of the main board or the at least one camera coupled to the multi-port network switch disposed within the bioptic scanner.

A method of capturing images of a read zone of a bioptic scanner in a retail environment comprises capturing first image data via a first camera disposed internally within the bioptic scanner, routing the first image data to a remote server through a multi-port network switch disposed within the bioptic scanner that is operably coupled with a main board disposed within the bioptic scanner, and capturing second image data via a second camera disposed internally within the bioptic scanner and transmitting the second image data to the main board for barcode decoding by a decoder.

DETAILED DESCRIPTION

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operably connected with each other, such as connected through a direct connection or through an indirect connection (e.g., via another structure or component).

"Image data" as used herein includes both individual frames as well as multiple frames (e.g., streaming video). Image data may be captured by one or more imagers positioned at various within the housing of the fixed retail scanner, such as in a horizontal base unit or a vertical bonnet of a bi-optic scanner having imagers positioned in two different planes. Single plane scanners (e.g., horizontal or vertical only housings) are also contemplated and within the scope of the disclosure. Image data may also be captured by one or more imagers positioned external to the primary scanning unit, such as peripheral devices (e.g., top-down reader imagers, security imagers, bottom of basket readers, etc.) that may also provide image data to the fixed retail scanner and/or remote systems.

Figure 1:
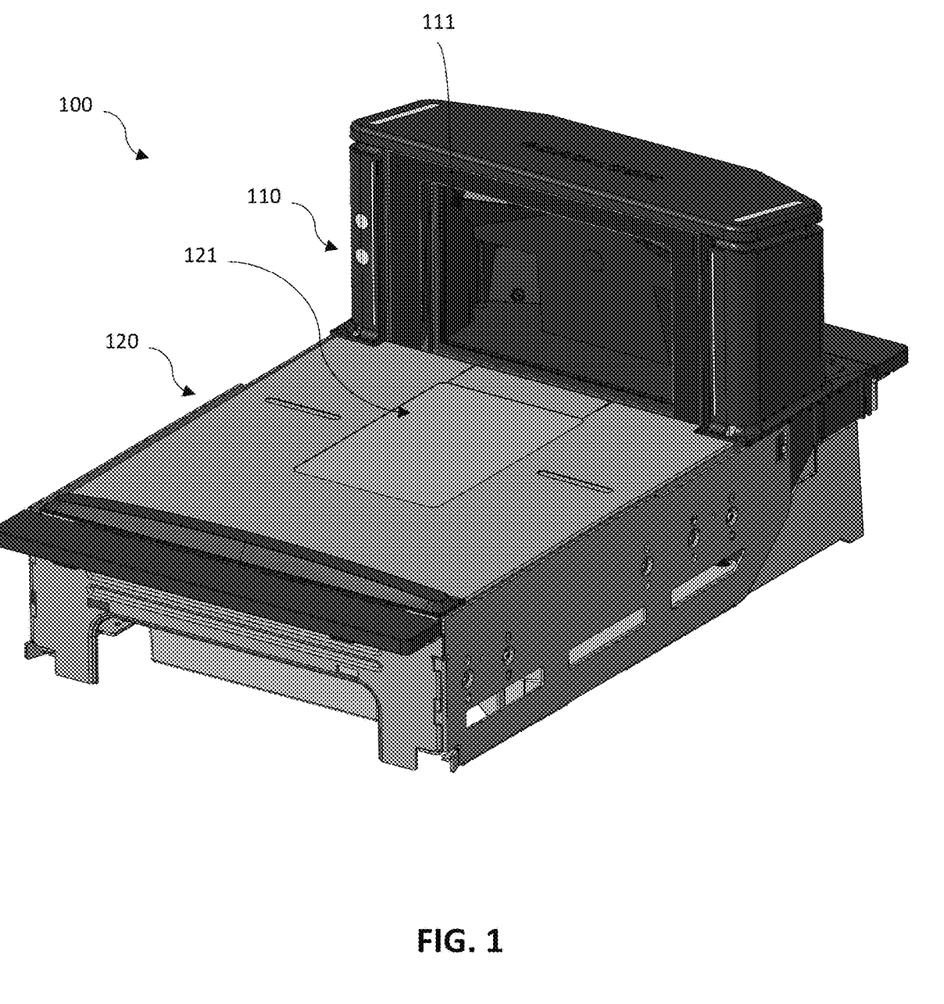
FIG. 1 is a perspective view of a data reader according to an embodiment of the disclosure.

FIG. 1 is a perspective view of a data reader 100 according to an embodiment of the disclosure. The data reader 100 may be a bi-optic fixed retail scanner having a vertical housing 110 and a horizontal housing 120. The vertical housing 110 may include a structure that provides for one or more camera fields-of-view (through a vertical window 111) within a generally vertical plane across the read zone of the data reader 100. The vertical structure provides an enclosure for one or more cameras and other optical elements (e.g., lenses, mirrors, etc.) and electrical elements (e.g., cables, circuit boards, etc.) therein. The horizontal housing 120 may include a structure that provides for one or more camera fields-of-view (through a horizontal window 121) within a generally vertical plane across the read zone of the data reader 100. The horizontal structure provides an enclosure for one or more cameras and other optical elements (e.g., lenses, mirrors, etc.) and electrical elements (e.g., cables, circuit boards, etc.) therein. Thus, the vertical housing 110 and the horizontal housing 120 may be generally orthogonal to each other (including slightly angled orientations, such as being in the range of ±10° from orthogonal). Depending on the arrangement and orientation of the different opto-electrical elements, certain elements related to providing a horizontal field-of-view may be physically located within the vertical structure and vice versa.

Figure 2:
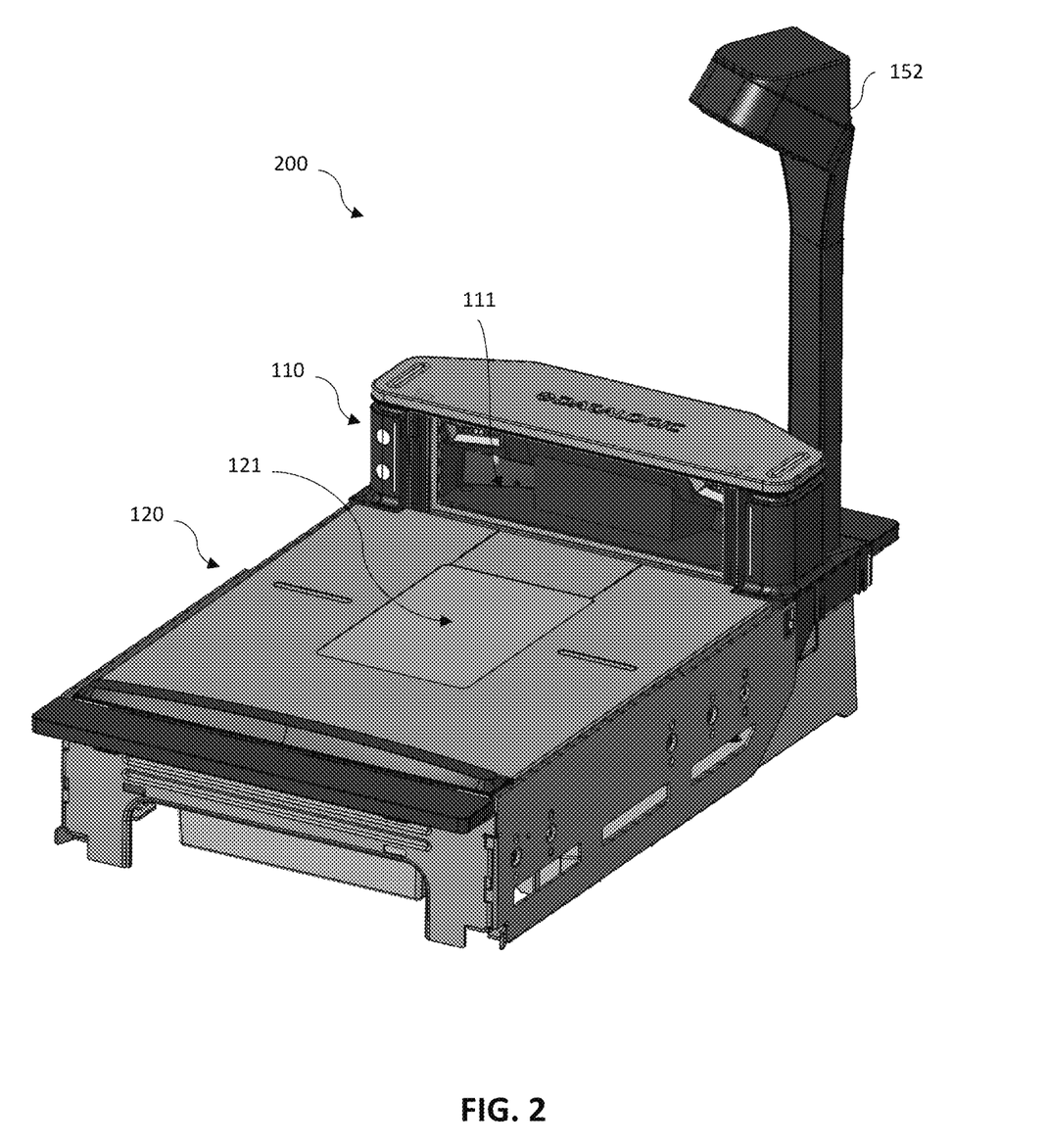
FIG. 2 is a perspective view of an illustrative data reader according to an embodiment of the disclosure.

FIG. 2 is a perspective view of an illustrative data reader 200 according to an embodiment of the disclosure. As with the data reader of FIG. 1, the data reader of FIG. 2 may also be a bi-optic fixed retail scanner having a vertical housing 110 and a horizontal housing 120. The data reader 200 may also include a top-down reader (TDR) 152 that includes a stand connected to the data reader 100 with a head that includes one or more imagers therein. Such imager(s) typically provide a generally close overhead (angled) view of the read zone to provide a top view of a product whereas internal cameras may be better suited for capturing images of the bottom and/or sides of the object within the read zone.

The vertical housing 110 of FIG. 2 may have a lower profile bonnet compared to that of FIG. 1, which may result in internal cameras having a lower incidence angle. Thus, such a form factor may be particularly well suited to include the TDR 152 (FIG. 3) as an optional add-on to the data reader 200. However, a TDR 152 may also be coupled to the data reader 100 of FIG. 1 having the taller bonnet. Such a TDR may need to be taller to accommodate the taller bonnet. In addition, some embodiments may include additional TDRs, such as on the other side of the bonnet, to provide another top view of the read zone. Thus, some embodiments may include one or more TDRs for data readers having different sized bonnets. It is also recognized that some embodiments may include single plane data readers such that certain features described herein are wholly located within a single plane housing (e.g., horizontal), which may further be coupled to other external devices or peripherals.

Different configurations and details regarding the construction and components of a fixed retail scanner are contemplated. For example, additional features and configurations of devices are described in the following patents and patent applications: U.S. Pat. No. 8,430,318, issued Apr. 30, 2013, and entitled "SYSTEM AND METHOD FOR DATA READING WITH LOW PROFILE ARRANGEMENT," U.S. Pat. No. 9,004,359, issued Apr. 14, 2015, entitled "OPTICAL SCANNER WITH TOP DOWN READER," U.S. Pat. No. 9,305,198, issued Apr. 5, 2016, entitled "IMAGING READER WITH IMPROVED ILLUMINATION," U.S. Pat. No. 10,049,247, issued Aug. 14, 2018, entitled "OPTIMIZATION OF IMAGE FRAME MANAGEMENT IN A SWEEP-STYLE OPTICAL CODE DATA READE," U.S. Pat. No. 10,248,896, issued Apr. 2, 2019, and entitled "DISTRIBUTED CAMERA MODULES SERIALLY COUPLED TO COMMON PREPROCESSING RESOURCES FACILITATING CONFIGURABLE OPTICAL CODE READER PLATFORM FOR APPLICATION-SPECIFIC SCALABILITY," and U.S. Patent Application Publication No. 2020/0125812, filed Dec. 2, 2019, and entitled "DATA COLLECTION SYSTEMS AND METHODS TO CAPTURE IMAGERS OF AND DECODE INFORMATION FROM MACHINE-READABLE SYMBOLS," the disclosure of each of which is incorporated by reference in their entirety. Such fixed retail scanners may be incorporated within assisted checkout stations having a clerk assisting a customer, while some embodiments include self-checkout stations in which the customer is the primary operator of the device. Such components and features may be employed in combination with those described herein.

Figure 3:
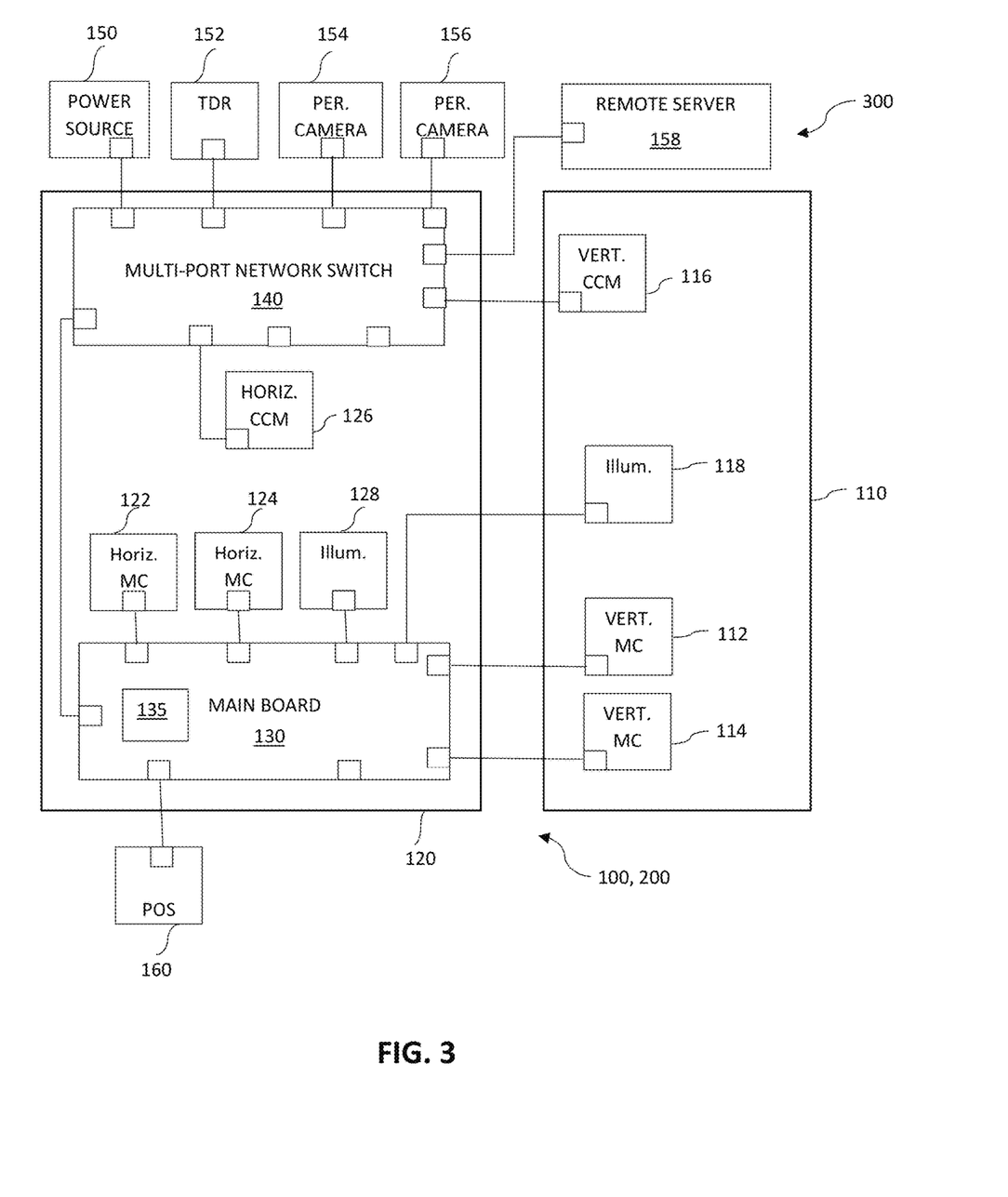
FIG. 3 is a simplified block diagram of an illustrative data reading system according to an embodiment of the disclosure.

FIG. 3 is a simplified block diagram of an illustrative data reading system 300 according to an embodiment of the disclosure. The data reading system 300 may include a data reader 100, 200 that may be operably coupled with one or more of a power source 150, the top-down reader (TDR) 152, peripheral cameras 154, 156, a remote service 158, or a point-of-sale (POS) system 160.

The data reader 100, 200 may be a bi-optic fixed retail scanner having a vertical housing 110 and a horizontal housing 120. The data reader 100, 200 may be installed in a retail environment (e.g., grocery store), which typically is disposed within a counter or other support structure of an assisted checkout lane or a self-checkout lane. The vertical housing 110 may include a structure that provides for one or more camera fields-of-view (through a vertical window) within a generally vertical plane across the read zone of the data reader 100, 200. The vertical structure provides an enclosure for one or more cameras 112, 114, 116, active illumination assemblies 118 (e.g., LED assemblies), and other optical elements (e.g., lenses, mirrors, etc.) and electrical elements (e.g., cables, circuit boards, etc.) therein. The horizontal housing 120 may include a structure that provides for one or more camera fields-of-view (through a horizontal window) within a generally vertical plane across the read zone of the data reader 100, 200. The horizontal structure provides an enclosure for one or more cameras 122, 124, 126, active illumination elements 128 (e.g., LED assemblies), and other optical elements (e.g., lenses, mirrors, etc.) and electrical elements (e.g., cables, circuit boards, etc.) therein. Thus, the vertical housing 110 and the horizontal housing 120 may be generally orthogonal to each other (including slightly angled orientations, such as being in the range of ±10° from orthogonal). Depending on the arrangement and orientation of the different opto-electrical elements, certain elements related to providing a horizontal field-of-view may be physically located within the vertical structure and vice versa.

The data reader 100, 200 may include one or more different types of imagers, such as monochrome imagers and/or color imagers. For example, vertical monochrome cameras 112, 114 may be configured to capture monochrome images through the vertical window of the data reader 100, 200. Likewise, horizontal monochrome cameras 122, 124 may be configured to capture monochrome images through the horizontal window of the data reader 100, 200. Vertical color camera module (CCM) 116 may be configured to capture color images through the vertical window of the data reader 100, 200. Likewise, horizontal color camera module (CCM) 126 may be configured to capture color images through the horizontal window of the data reader 100, 200. Monochrome images may be analyzed (e.g., by a decoder) to decode one or more indicia (e.g., 1D barcodes, 2D barcodes, optical character recognition, digital watermarks, etc.). Color images may be analyzed (e.g., by an image processor) to perform analysis on the images where color information may be particularly useful in performing certain functions, such as produce recognition, item recognition or verification, and/or security analysis. Such analysis may be performed by local and/or remote processors that may contain an artificial intelligence (AI) engine or otherwise configured to perform other machine learning techniques.

The data reader may further include a main board 130 and a multi-port network switch 140. As shown herein, the main board 130 and the multi-port network switch 140 may be physically housed within the horizontal housing 120. Bi-optic readers tend to have larger horizontal housings in order to provide support for the device within a cavity in a counter, which also provides space for a scale (not shown) used to weigh produce or other items sold by weight or otherwise perform weighing of items when placed on the horizontal surface (often called a "weigh platter"). It is contemplated that some embodiments may include the main board 130 and/or the multi-port network switch 140 to be physically located within the vertical housing 110. In such an embodiment where one of the multi-port network switch 140 or the main board 130 is physically located within the vertical housing 110 and the other is physically located within the horizontal housing 120, the two boards may be generally oriented orthogonal to each other similar to the orientation of the windows or other angled arrangements (e.g., slightly angled orientations such as being in the range of ±10° from orthogonal). The ports may be at least somewhat aligned in the orthogonal direction or other arrangement to accommodate easy connection of network cables therebetween.

The main board 130 may be operably coupled with the vertical monochrome imagers 112, 114 and the horizontal monochrome imagers 122, 124. These connections may be via a communication interface (e.g., a MIPI interface). The main board 130 may have decoding software embedded therein such that one or more on-board processors 135 may receive monochrome images to perform decoding on the optical indicia and provide the decoding result to a point-of-sale (POS) system 160 operably coupled thereto to complete a transaction. The one or more on-board processors 135 may also be configured to provide control (e.g., coordination or synchronization) of the various components of the system including camera exposure and timing of active illumination assemblies 118, 128 of the system. Although a single block is shown representing one or more on-board processors 135, it is contemplated that some embodiments may include multiple processing components (e.g., microprocessors, microcontrollers, FPGAs, etc.) configured to perform different tasks, alone or in combination, including object detection, system control, barcode decoding, optical character recognition, artificial intelligence, machine learning analysis, or other similar processing techniques for analyzing the images for product identification or verification or other desired events.

The multi-port network switch 140 may be operably coupled to vertical CCM 116 and horizontal CCM 126 located within the data reader 100, 200. The multi-port network switch 140 may also be operably coupled with main board 130 located within the data reader 100, 200. Multi-port network switch 140 may also be operably coupled to the power source 150 as well as peripheral devices, such as the TDR 152, peripheral cameras 154, 156, and/or the remote server 158. The number, and types of peripheral devices, may depend on a desired application within a retail environment. The TDR 152 may be configured as a stand connected to the data reader 100, 200 that typically provides a generally close overhead (angled) view of the read zone to provide a top view of a product whereas internal cameras 112, 114, 116, 122, 124, 126 may be better suited for capturing images of the bottom and/or sides of the object within the read zone. Peripheral cameras 154, 156 may be located remotely from the data reader 100, 200, such as being mounted on a ceiling or wall of the retail environment to provide additional views of the read zone or checkout area. Such views may be useful for security analysis of the checkout area, such as product verification, object flow, human movements, etc. Such analysis may be performed by a remote service or other local devices (e.g., located on or otherwise coupled to the main board 130 or multi-port network switch 140). Other peripheral devices may be located near the data reader 100, 200, such as a peripheral presentation scanner resting or mounted to a nearby surface, and/or a handheld scanner that also may be used for manual capturing by the user (e.g., checkout assistant or self-checkout customer). Such devices may be coupled directly to the main board 130 in some embodiments or to the multi-port network switch 140 if so enabled. As shown, the POS 160 may be coupled directly to the main board 130. Such a connection may be via communication interfaces, such as USB, RS-232, or other such interfaces. In some embodiments, the POS 160 may be coupled directly to the multi-port network switch 140 if so enabled (e.g., as an Ethernet connected device).

The multi-port network switch 140 may be implemented on a separate board from the main board 130. In some embodiments, the multi-port network switch 140 may be implemented on the main board 130 that also supports the one or more processors 135 also described herein. The multi-port network switch may include multiple ports to provide advanced network connectivity (e.g., Ethernet) between internal devices (e.g., CCMs 116, 126) within the data reader 100, 200 and external devices (e.g., TDR 152, peripheral camera(s) 154, 156, remote server 158, etc.) from the data reader 100, 200. Thus, the multi-port network switch 140 may provide an Ethernet backbone for the elements within the data reader 100, 200 as well as for external devices coupled to the data reader 100, 200 for control and/or managing data flow or analysis. As an example, multi-port network switch 140 may be implemented with a KSZ9567 Ethernet switch or other EtherSynch® product family member available from Microchip Technology Inc of Chandler, Arizona or other similar products and/or devices configured to provide network synchronization and communication with multiple network-enabled devices. Embodiments of the disclosure may include any number of ports supported by the multi-port network switch to couple to both internal devices (e.g., main board, cameras, etc.) and external devices (e.g., peripheral cameras, TDR, illumination sources, remote servers, etc.) to provide a flexible platform to add additional features for connecting with the data reader 100, 200.

Although FIG. 3 shows one block for active illumination assemblies 118, 128 in each of the vertical and horizontal housings 110, 120, some embodiments may include multiple such assemblies in each of the horizontal and vertical housings 110, 120 in order to provide for different lighting options at different angles across the read zone. For example, the vertical housing 110 may include two (or more) illumination assemblies therein at different locations and/or different colors for a desired illumination field from the vertical view. Likewise, the horizontal housing 120 may include two (or more) illumination assemblies therein at different locations and/or different colors for a desired illumination field from the horizontal view. As shown herein, the illumination assemblies 118, 128 may be coupled directly to the main board 130. However, in some embodiments, additional components may be coupled within the path from the main board 130, such as a control panel or other such device. In yet other embodiments, the illumination assemblies 118, 128 may be coupled to the multi-port network switch 140 which may route triggering controls from the main board 130. TDR 152 and one or more of the peripheral cameras 154, 156 may also include associated illumination assemblies. Synchronization of such illumination sources may be managed by the multi-port network switch 140 as controlled by the main board 130. In some embodiments, the multi-port network switch may employ or leverage IEEE1588 Precision Time Protocol to synchronize the illumination system with remote cameras, which may enable clock accuracy in sub-microsecond range.

In operation, images may be captured by the cameras 112, 114, 116, 122, 124, 126. Monochrome images may be captured by monochrome cameras 112, 114, 122, 124 and color images may be captured by color cameras 116, 126. The multi-port network switch 140 may be configured to coordinate (e.g., synchronize) timing of camera exposure and active illumination (e.g., white illumination) with the color cameras 116, 126 (as controlled by the controller on the main board 130) to occur in an offset manner with the timing of the camera exposure and active illumination (e.g., red illumination) with the monochrome cameras 112, 114, 122, 124.

Image data (e.g., streaming video, image frames, etc.) from the color cameras 116, 126 may be routed through the multi-port network switch 140 to the processing/analysis modules located internal to the data reader 100, 200, such as the one or more processors 135 supported by the main board 130. As such, image analysis (e.g., AI, machine learning, OCR, object recognition, item validation, produce recognition, analytics, etc.) may be performed on the color images internally within the data reader 100, 200 by the one or more processors 135 supported by the main board 130. In some embodiments, barcode decoding may also be performed on the color images internally within the data reader 100, 200 by the one or more processors 135 supported by the main board 130. Image data from the color cameras 116, 126 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on the color images externally to the data reader 100, 200 by external devices coupled through the multi-port network switch 140. Such color images or other data stream may be routed directly to the network connected external devices through the multi-port network switch 140 without first being received by the main board 130 (if at all). In other words, image data may be communicated (e.g., passed) from at least one imager internal to the data reader through the at least one multi-port network device 140 and on to at least one external device bypassing the main board 130. Having a connection to both the main board 130 as well as to external devices via the multi-port network switch enables image data to be provided to internal as well as external processing resources.

Image data from the monochrome cameras 112, 114, 122, 124 may be provided to the main board 130 to the processing/analysis modules located internal to the data reader 100, 200 such as the one or more processors 135 supported by the main board 130. As such, barcode decoding may also be performed on the color images internally within the data reader 100, 200 by the one or more processors 135 supported by the main board 130. In some embodiments, image analysis (e.g., AI, machine learning, OCR, object recognition, item validation, produce recognition, analytics, etc.) may be performed on the monochrome images internally within the data reader 100, 200 by the one or more processors 135 supported by the main board 130. Image data from the monochrome cameras 112, 114, 122, 124 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on the monochrome images externally to the data reader 100, 200 by external devices coupled through the multi-port network switch 140. Such monochrome images or other data stream may be routed directly to the network connected external devices to the multi-port network switch 140 after first being received by the main board 130.

Image data (e.g., streaming video, image frames, etc.) from the TDR 152 or other external peripheral cameras 154, 156 may be routed through the multi-port network switch 140 to the processing/analysis modules located internal to the data reader 100, 200, such as the one or more processors 135 supported by the main board 130. As such, image analysis (e.g., AI, machine learning, OCR, object recognition, item validation, produce recognition, analytics, etc.) may be performed on the images (e.g., color and/or monochrome) internally within the data reader 100, 200 by the one or more processors 135 supported by the main board 130. In some embodiments, barcode decoding may also be performed on such images internally within the data reader 100, 200 by the one or more processors 135 supported by the main board 130. Image data from the TDR 152 or other external peripheral cameras 154, 156 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on these images externally to the data reader 100, 200 by external devices coupled through the multi-port network switch 140. Such images or other data stream may be routed directly to the network connected external devices through the multi-port network switch 140 without first being received by the main board 130 (if at all).

The multi-port network switch 140 may be coupled to the main board 130 via a single cable configured to provide power and communication to the main board 130. Power may be provided to the system via power source 150 via the multi-port network switch 140, which in turn provides power (e.g., power over Ethernet (PoE)) to the main board 130 and the color cameras 116, 126. Monochrome cameras 112, 114, 122, 124 and illumination assemblies 118, 128 may be powered via the main board 130.

Features of employing the multi-port network switch 140 as a primary backbone for communication and power to interface between both internal and external components of the system include enabling power, communications, and camera/illumination synchronization to occur over a single cable between such connected components. In addition, precision time protocol (PTP), generic precision time protocol (GPTP), time sensitive networking (TSN) may provide an improved synchronization (e.g., within 1 microsecond error) for an open standard, widely supported, single cable solution. In addition, scanner maintenance tools may be simplified via improved network connectivity.

In some embodiments, the multi-port network switch 140 may be disposed within an external module having its own housing separate from the data reader 100. The multi-port network switch 140 may, thus, be located outside of the bioptic housing of the data reader 100 but may operably couple to the main board 130 and internal devices (e.g., vertical CCM 116, horizontal CCM 126) as well other external devices (e.g., TDR 152, cameras 154, 156, server 158, etc.) for providing the network backbone for communication and/or power as described above.

Figure 4:
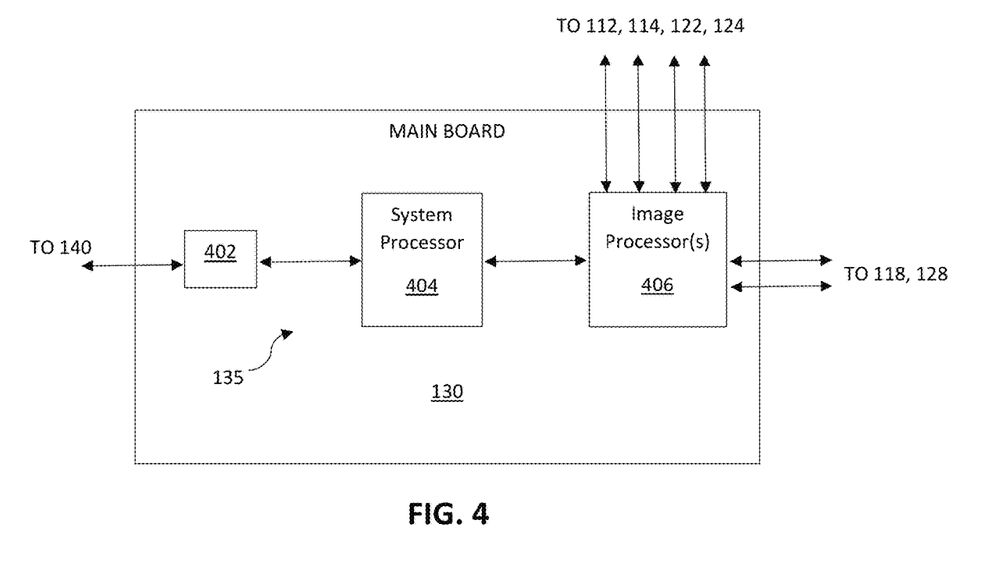
FIG. 4 is a simplified block diagram of certain components mounted on the main board according to an embodiment of the disclosure.

FIG. 4 is a simplified block diagram of certain components mounted on the main board 130 according to an embodiment of the disclosure. In particular, further details are provided regarding the one or more processors 135 that may include an Ethernet physical layer 402, a system processor 404, and an image processor 406. Additional processing elements are also contemplated among the one or more processors 135, such as, for example, an artificial intelligence (AI) accelerator disposed on the main board 130 and coupled to the system processor 404 (e.g., via insertion into a PCIe slot on the main board 130).

The system processor 404 may be coupled to each of the Ethernet physical layer 402 and the image processor 406. The Ethernet physical layer 402 may be coupled with the multi-port network switch 140 to provide an interface between the main board 130 and the multi-port network switch 140. The image processor 406 may be coupled to the monochrome imagers 112, 114, 122, 124 to provide control (e.g., sync signal) and to receive monochrome images therefrom. The image processor 406 may be configured to receive and format image data from the cameras 112, 114, 122, 124 before being received by the system processor 404. In some embodiments, multiple image processors may be present such that each camera 112, 114, 122, 124 may have its own image processor associated therewith. In some embodiments, cameras may share an image processor for transmission to the system processor 404. For example, a single image processor (e.g., FPGA) may be configured to combine (e.g., concatenate) the image data from each of the monochrome cameras 112, 114, 122, 124 for the system processor to receive multiple views at a single point in time through one input. An example of such a process is described in U.S. Patent Publication No. 2022/0207969, filed Dec. 31, 2020, and entitled "FIXED RETAIL SCANNER WITH ANNOTATED VIDEO AND RELATED METHODS," the disclosure of which is incorporated by reference in its entirety. Image processor 406 may also be coupled to the illumination assemblies 118, 128 to provide control thereto (e.g., sync signal). In some embodiments, the sync signal may be generated by one of the Ethernet physical layer 402 or the system processor 404, and which may be based on a system clock signal.

Figure 5:
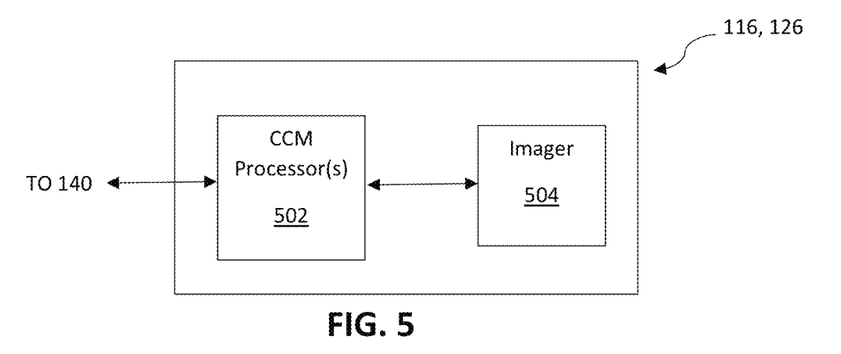
FIGS. 5-7 are different simplified block diagrams of the various imager modules according to an embodiment of the disclosure.
Figure 6:
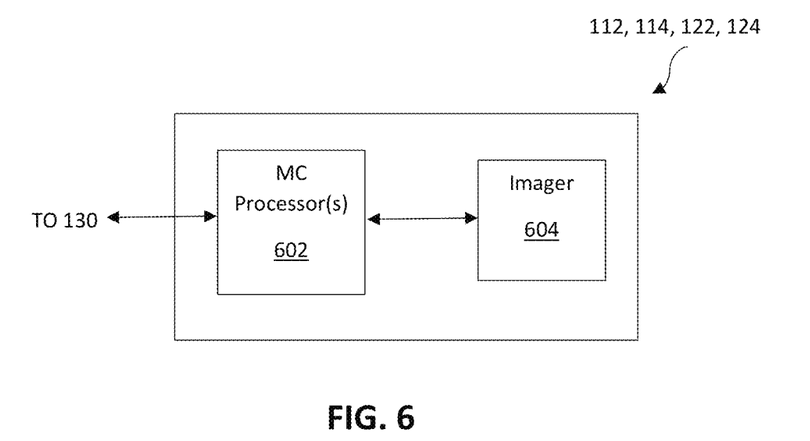
Figure 7:
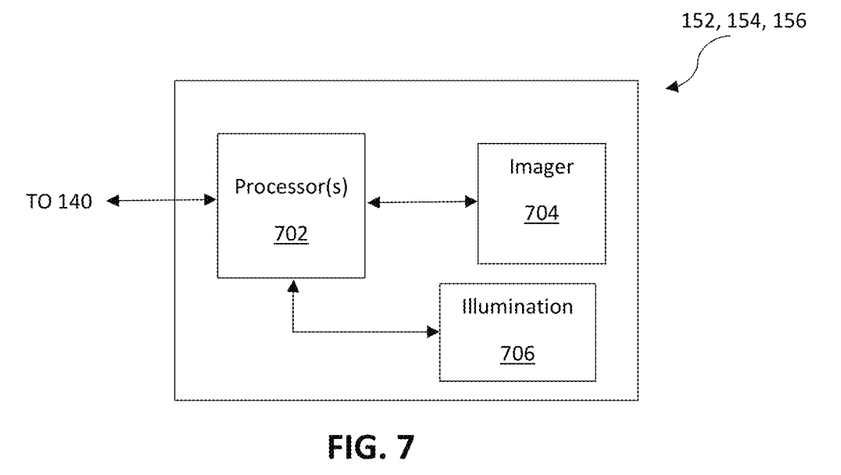

FIGS. 5-7 are different simplified block diagrams of the various imager modules according to an embodiment of the disclosure. For example, FIG. 5 may refer to one of the color camera modules 116, 126, FIG. 6 may refer to one of the monochrome camera (MC) modules 112, 114, 122, 124, and FIG. 7 may refer to one of the TDR 152 or peripheral cameras 154, 156 as examples.

Referring to FIG. 5, the color camera module (CCM) 116, 126 may include a CCM processor 502 that couples to a color imager 504 and to the multi-port network switch 140. The CCM processor 502 may include one or more processors that perform different functions, such as control, formatting, and/or certain analysis functionality, etc. Active illumination for the color camera module 116, 126 may occur off-board via separate illumination assemblies 118, 128. In some embodiments, separate on-board processors may not be present for one or more of the CCM modules 116, 126 such that the control for such may be directly from the main board (e.g., system processor 404) and/or via the multi-port network switch 140 rather than with its own CCM processor 502.

Referring to FIG. 6, the monochrome camera module 112, 114, 122, 124 may include a MC processor 602 that couples to a monochrome imager 504 and to the main board 130 directly. However, it is also contemplated that the monochrome imagers 504 may be connected to the multi-port network switch 140. The MC processor 602 may include one or more processors that perform different functions, such as control, formatting, and/or certain analysis functionality, etc. Active illumination for the MC camera module 112, 114, 122, 124 may occur off-board via separate illumination assemblies 118, 128. In some embodiments, separate on-board processors may not be present for one or more of the MC camera modules 112, 114, 122, 124 such that the control for such may be directly from the main board (e.g., system processor 404 and/or image processor 406) rather than its own MC processor 602.

Referring to FIG. 7, the TDR 152 or other peripheral cameras 154, 156 may include a processor 702 that couples to an imager 704 (e.g., color and/or monochrome depending on application) and to the multi-port network switch 140. The processor 702 may include one or more processors that perform different functions, such as control, formatting, and/or certain analysis functionality, etc. In some embodiments, certain camera modules (e.g., TDR 152 or other peripheral cameras 154, 156) may have their own active illumination assembly 706 associated therewith that may different than the illumination assemblies 118, 128 within the bioptic housing. The illumination assembly 706 may be located on-board as shown or may be provided at a separate location that may still be within the camera module housing. In some embodiments, separate on-board processors may not be present for the TDR 152 such that the control for such may be directly from the main board (e.g., system processor 404) and/or via multi-port network switch 140 rather than with its own TDR processor 702.

Synchronization of at least some of the active illumination source (e.g., assemblies 118, 128, 706, etc.) with each other and with the exposures of the corresponding camera modules (e.g., modules 112, 114, 122, 124, 116, 126, 152, 154, 156, etc.) may be based on time stamps corresponding to packets being generated and received over the network (e.g., IEEE1588 Precision Time Protocol) when generating and transmitting the sync signal to each device. Each device may determine the elapsed time between packet generation and reception based on the time stamps in order to synchronize according to the illumination/exposure scheme designated for each device.

As an example, each device (e.g., system processor 404, horizontal CCM 126, vertical CCM 116, TDR 152, and other peripheral cameras) connected to the multi-port network switch 140 may generate a sync signal (e.g., 1 PPS sync signal) that align with each other based on a common time base. Within each device, one or more separate counters may control the generation of trigger signals for the imager and illumination control signals for the active illumination. The counter(s) may cycle through a sequence of imager triggers and illumination control signals (that may be spaced a predetermined time to account for actual activation times). These internal counters may be overlayed with the internally managed sync signal such that the sync event marks the beginning of the counter time period. Within each device, the respective internal counter may be used to define when the actual trigger signals for imagers and/or illuminations are to be activated relative to the start of the counter (and the 1 PPS sync signal). As an example, the sync signal may initiate the internal counters within a respective device and/or adjust the count values loaded into the counters in order to synchronize across the system. A frame counter may have a duration that defines how often the frame sequence occurs for the cameras controlled by the respective device. An illumination counter may have a duration that defines how often the illumination sequence occurs for different illumination groups controlled by the respective device. In some embodiments, the illumination counter is loaded with half the frame period. As a result, the illumination may be activated at a higher rate than the imagers which may reduce flicker perceived by the user. The actual trigger/activation signal for the camera or imager may be at a predefined time within the duration of the respective counter. If a different illumination scheme is desired, the system processor may load different trigger values and/or count values to the respective registers throughout the different devices. Each counter may expire (e.g., decrement or increment) and reload (e.g., when it reaches zero or some other value) based on its own frequency (e.g., 1 MHz) that may be different than the sync signal.

As sync signals are adjusted depending on packet time stamps during regular communication over the network (e.g., IEEE 1588), the sync signals generated on each device may separately be adjusted to the common time base, which in turn causes the overlayed counters on each device to align as the overlayed counters are dependent on the 1 PPS sync signal. Because each device maintains its own 1 PPS sync signal and internal counter that is overlayed thereto, synchronization may be maintained without needing to send separate synchronization signals to each other, but rather adjusted based on network communications. Thus, for every network sync signal, these counters may operate through the different stages with the adjusted network sync signal operating to periodically realign the internal counters of each device. Although the sync signal is sometimes referred herein to as 1 pulse per second (PPS), other frequencies for generation of this synchronization clock are also contemplated, which could result in more frequent or less frequent synchronization of the system time base as desired.

Figure 8A:
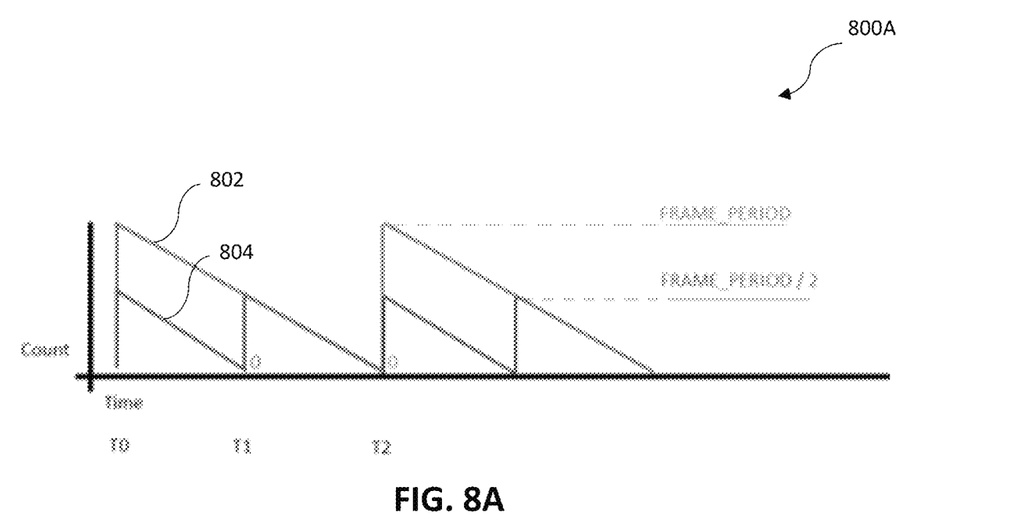
FIGS. 8A and 8B are examples of waveforms showing illumination and exposure counters for an illumination source and a corresponding imager according to embodiments of the disclosure.
Figure 8B:
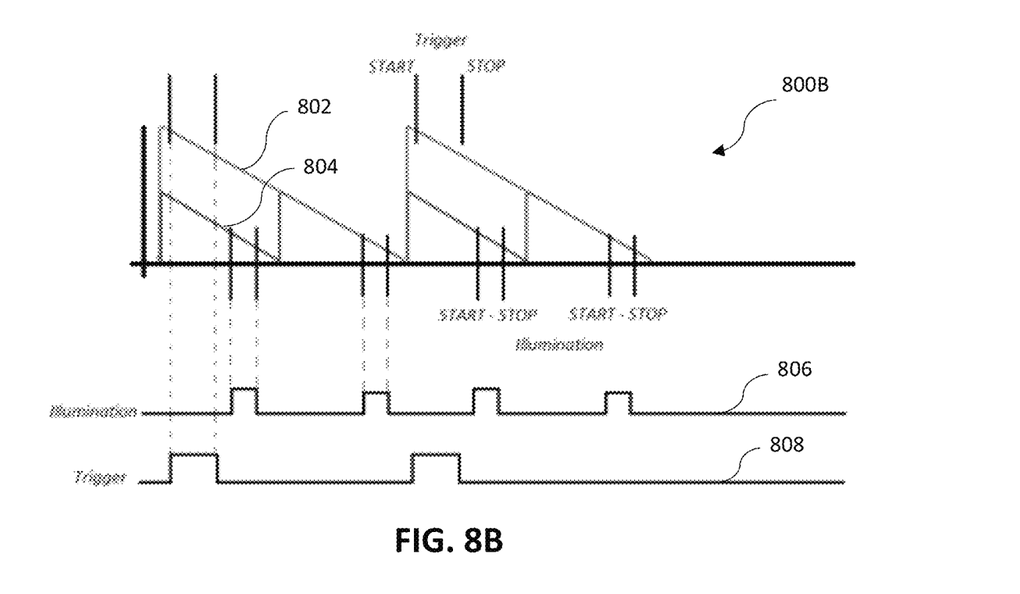

FIGS. 8A and 8B are examples of waveforms showing illumination and exposure counters (e.g., frame counter 802, illumination counter 804) for an illumination source and a corresponding imager according to embodiments of the disclosure. At the beginning of each frame, the frame counter 802 for the corresponding imager may be loaded with a frame period from a register file. At the same time, the illumination counter 804 for the corresponding illumination source may be loaded with an illumination period from a register file. The counters 802, 804 may change (e.g., decrement in some embodiments, or increment in some embodiments) until its limit (e.g., zero for decrementing) is reached after which the counter is reloaded. In some embodiments, illumination period may be set to be one half of the frame period (e.g., illumination period=frame period/2). In some embodiments, the illumination frequency (e.g., 60 Hz) may be double the frame rate (e.g., 30 Hz) for the imagers.

Certain events may be controlled using these counters 802, 804 as shown in FIG. 8B. Predetermined (e.g., configurable) start and stop registers associated with the counters 802, 804 may implement a respective illumination waveform 806 (for controlling a corresponding illumination source) or a trigger waveform 808 (for controlling a corresponding imager). Different illumination sources may have different start/stop registers depending on when the illumination source is desired to occur. For example, start/stop registers associated with red LEDs of the illumination assemblies 118, 128 may set for a time near the beginning of the illumination cycle, start/stop registers associated with white LEDs of the illumination assemblies 118, 128 may be set for a time near the end of the illumination cycle. Start/stop registers associated with the illumination assembly 706 (e.g., FIG. 7) of an external device, such as a TDR, may be set for another time (e.g., immediately after the red LEDs). Start/stop registers for the trigger waveform 808 of a corresponding imager may be similarly positioned depending on the time when the respective imager is to capture an image (e.g., during red, white, and/or ambient illumination). Other illumination schemes (e.g., including relative timing and specific wavelengths) are contemplated and such examples described herein are non-limiting.

The counters 802, 804 and the related start/stop registers may be implemented by the controller for a particular imager and/or illumination source. For example, in some embodiments, the one or more processors 135 of the main board (e.g., image processor 406 of FIG. 4) may execute the counter 802 associated with the illumination sources 118, 128, and the counter 804 associated with the MCs 112, 114, 122, 124. In some embodiments, the CCMs 116, 126 may execute their own imager counter 804 such as via CCM processor 502 (FIG. 5). In some embodiments, one or more peripheral cameras 152, 154, 156 (e.g., TDR) may execute their own illumination counter 802 and/or imager counter 804 such as via processor 702 (FIG. 7). These various counters may be synchronized via network communications via the multi-port network switch 140 such as a 1 pulse-per-second (1 PPS) signal or other time period determined by the network traffic of the multi-port network switch 140. As discrepancies in the synchronization are identified from the network communications, adjustments may be made to the start count values that are loaded for the respective counter during the next period before the next adjustment is made (e.g., the next 1 PPS signal). As a result, different devices may remain synchronized without a discrete synchronization signal being transmitted to each respective device.

Referring again briefly to FIG. 4, the system processor 404 and/or the image processor 406 may generate a 1 PPS sync signal and overlay an internal counter to that sync signal to control the triggering of the monochrome imagers 112, 114, 122, 124 and activate the different sub-groups of the illumination assemblies 118, 128 described in more detail hereinbelow. As an example, the system processor 404 may generate the 1 PPS sync signal that is sent to the image processor 406 which maintains the internal counters that are tied to the 1 PPS sync signal. The internal counters define the relative timing for sending the image trigger signal to the monochrome imagers 112, 114, 122, 124 and the corresponding illumination control signals to the sub-groups of the illumination assemblies 118, 128.

Referring again briefly to FIG. 5, the CCM processor 502 for each CCM 116, 126 may generate a 1 PPS sync signal and overlay an internal counter to that sync signal to control the triggering of its imager 504. For example, the vertical CCM 116 may maintain its own 1 PPS sync signal and overlay its own internal counter to that sync signal to control the triggering of its imager. Likewise, the horizontal CCM 126 may maintain its own 1 PPS sync signal and overlay its own internal counter to that sync signal to control the triggering of its imager. If these devices control their own active illumination, separate illumination trigger signals may be generated as well. Otherwise, the synchronization of the imagers of the CCMs 116, 126 may be aligned with the appropriate sub-group of the illumination assemblies 118, 128 (that are controlled by the system processor 404 and/or image processor 406).

Referring again briefly to FIG. 6, the MC processor 602 for each MC 112, 114, 122, 124, may receive the trigger signal from the main board (e.g., image processor 406) to determine the triggering of the imager 604. In this embodiment, the main board maintains the 1 PPS sync signal (e.g., maintained by the system processor 404) and/or internal counter (e.g., maintained by the image processor 406) and the imager 604 is responsive to the trigger signals received from devices on the main board 130. In such an embodiment, the MC processor 602 may not be necessary or included. In some embodiments, the MCs 112, 114, 122 124 may be operably coupled to the multi-port network switch 140 in which case it may be beneficial for the MCs 112, 114, 122 124 (e.g., via MC processor 602) to maintain its own 1 PPS sync signal and/or internal controllers that are synchronized with the others connected through the network switch 140.

Referring again to FIG. 7, the processor 702 for the TDR 152 (or other peripheral camera 154, 156) may generate a 1 PPS sync signal and overlay one or more internal counters to that sync signal to control the triggering of its imager 704 and any corresponding illumination control signals of any active illumination 706 controlled thereby.

Depending on the timing of the desired trigger, different illumination may be aligned with different imager activation throughout the system. For example, if it is desirable for the vertical CCM 116 and the horizontal CCM 126 to trigger at the same time, each of their respective internal counters may define the corresponding trigger signal to be at the same duration from the beginning of the counter (and also, therefore, the 1 PPS sync signal to which the horizontal and vertical CCMs 116 and 126 are tied). If the TDR 152 is desired to be triggered at a different time, an internal counter of the TDR 152 may define a trigger therefor and/or illumination at different times such that the trigger and/or illumination are offset from the others. If that misalignment is desired to be changed, then the internal counters definitions may be changed such that the definition of the activation of the triggering pulse may be changed.

During operation and communication of packets of each of these devices with the multi-port network switch 140, each device may determine the elapsed time between packet generation and reception based on the time stamps in order to synchronize (e.g., align 1 PPS sync signal via IEEE 1588) to the common time base. As a result, the illumination/exposure scheme designated for each device across the whole system may be maintained. Additional detail regarding control and synchronization of LEDs relative to each other, including examples of various illumination sequences, is described in U.S. patent application Ser. No. 17/154,512, filed Jan. 21, 2021, and entitled "IMAGE-READING DEVICE HAVING CONFIGURABLE MULTI-MODE ILLUMINATION AND MONOCHROME COLOR IMAGE CAPTURE AND RELATED METHODS," the disclosure of which is incorporated by reference in its entirety.

In some embodiments, the housings of the TDR 152 and/or peripheral cameras 154, 156 may include multiple imagers disposed therein. In some embodiments, imagers may have separate connections to the multi-port network switch 140 (e.g., directly or via their own separate processor) or main board 130 to communicate (e.g., data flow, synchronization, etc.) with the base scanner as with the other imagers (e.g., 704) inside the housing as described above. In some embodiments, such additional imagers may have a separate connection to a remote device (e.g., server) directly that bypasses the base scanner. In such embodiments, synchronization may occur via internal controls, from another remote device, and/or via communication with the processor (e.g., 702) or main imager 704 that maintain the counters within the respective housing.

Similarly, one or more additional CCMs may be disposed within the housing of the base scanner (e.g., within the vertical portion 110 or within the horizontal portion 120). Such additional CCMs may have separate connections to the multi-port network switch 140 (e.g., directly or via their own separate processor) to communicate (e.g., data flow, synchronization, etc.) with the base scanner as with the other CCMs (e.g., 116, 126) inside the housing as described above. In some embodiments, such additional CCMs may have a separate connection to a remote device (e.g., server) directly that bypasses the multi-port network switch 140. In such embodiments, synchronization may occur via internal controls, from another remote device, and/or via communication with the main board 140 that maintains counters (e.g., for the MCs) within the base scanner housing.

Figure 9:
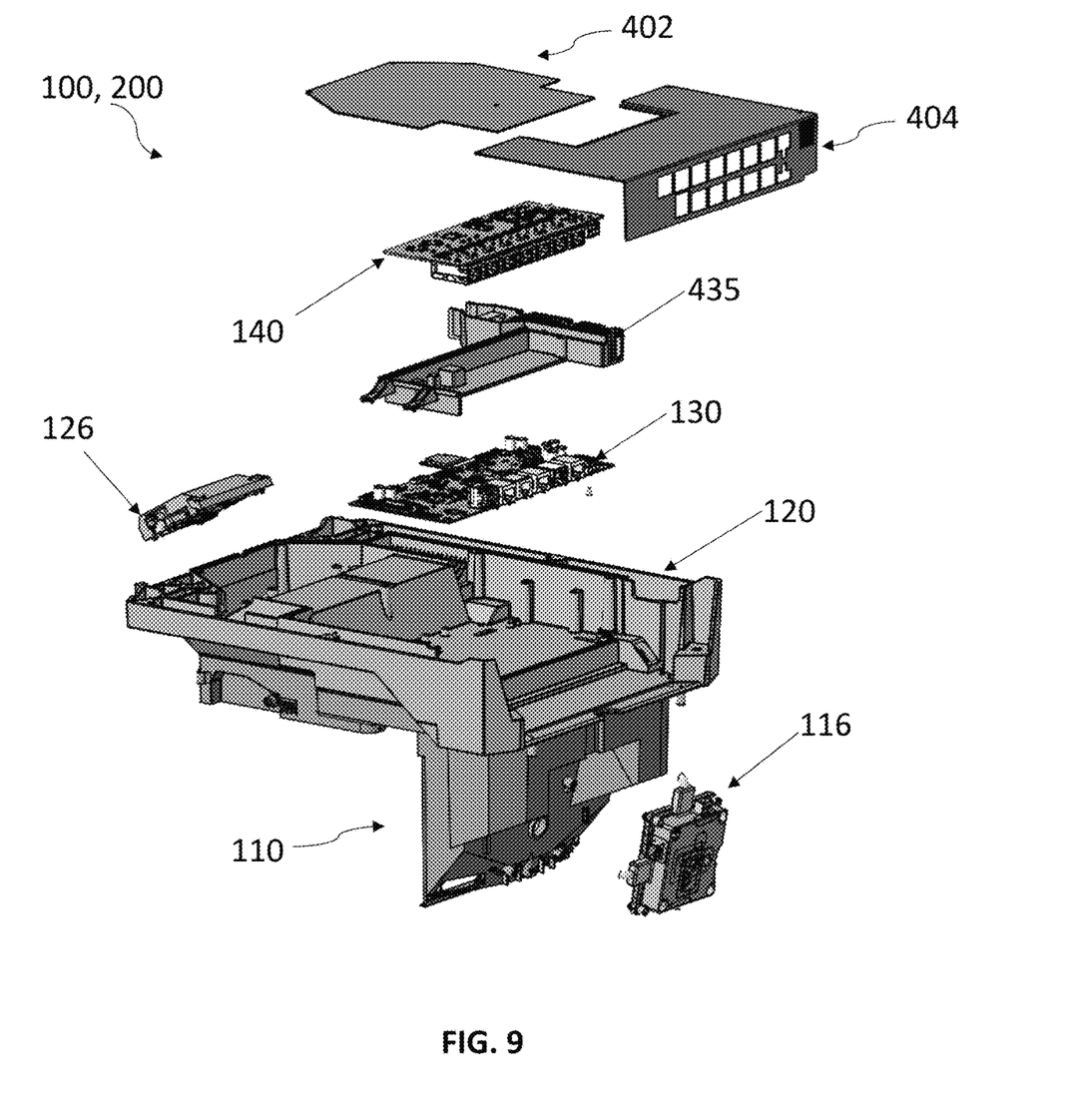
FIG. 9 is an exploded view of the data reader according to an embodiment of the disclosure having outer covers of the horizontal housing and vertical housing removed.

FIG. 9 is an exploded view of the data reader 100 according to an embodiment of the disclosure having outer covers of the horizontal housing 120 and vertical housing 110 removed. The data reader 100 is flipped in an upside-down orientation to better focus on the arrangements of the components within the horizontal housing 120. It should be noted that some components (e.g., monochrome cameras, LED illumination, etc.) are not shown for simplification of the view. The main board 130 may be disposed and mounted (e.g., via screws) within a void (i.e., cavity) within or defined by the lower chassis of the horizontal 120. The multi-port network switch 140 may be disposed within the void as well in a stacked arrangement between a surface of the lower chassis of the horizontal housing 120 and outer cover(s) 402, 404. Although the main board 130 is shown as being secured to rest against the lower chassis of the horizontal housing 120 with the multi-port network switch 140 secured on top of the main board 130, some embodiments may include the multi-port network switch 140 secured to rest against the lower chassis of the horizontal housing 120 with the main board 130 secured on top of the multi-port network switch 140.

The void wherein the main board 130 and the multi-port network switch 140 are located may be positioned proximate the back of the lower chassis of the horizontal housing 120 as shown in FIG. 9. A separate void (i.e., cavity) may be located proximate the front of the lower chassis of the horizontal housing 120, wherein the horizontal CCM may be disposed and secured to be pointed toward the window of the data reader 100 to capture images.

In some embodiments, a heatsink 435 may be disposed in the stacked arrangement of the main board 130 and the multi-port network switch 140, such as being located between the main board 130 and the multi-port network switch 140. The heatsink 435 may also provide support for the multi-port network switch 140 and the main board 130 to be secured to each other in the stacked arrangement. Thus, the heatsink 435 may be a single structure mounted directly to one or both of the multi-port network switch 140 or the main board 130.

The heatsink 435 may be thermally coupled with the multi-port network switch 140 and the data reader housing, such as the lower chassis (i.e., frame) of the horizontal housing 120. The heatsink 435 may provide contacts to components (e.g., processor chip(s)) on the multi-port network switch 140 to provide heat dissipation to the lower chassis of the horizontal housing 120 generated by the multi-port network switch 140. In some embodiments, the heatsink 435 may provide contacts to components (e.g., processor chip(s)) on the main board 130 to provide heat dissipation to the lower chassis of the horizontal housing 120 generated by the main board 130. In some embodiments, the heatsink 435 may provide contacts to components (e.g., processor chip(s)) on both the main board 130 and the multi-port network switch 140 to provide heat dissipation to the lower chassis of the horizontal housing 120 generated by both the main board 130 and the multi-port network switch 140. Thus, a first side of the heat sink 435 may contact components on the multi-port network switch 140, and a second side of the heat sink 435 may contact components on the main board 130 to provide shared heat management of both boards within the stacked arrangement to dissipate heat to the lower chassis of the horizontal housing 120. Additional configurations for heat management are also contemplated.

Some embodiments of the disclosure may include the heatsink 435 not being located between the multi-port network switch 140 and the main board 130. For example, the heatsink 435 may be located on top of the stacked arrangement coupling to the multi-port network switch 140 only. In this arrangement, components of the multi-port network switch 140 may point away from the main board 130 with the top of the stack having the heat sink 435 mounted thereon to provide contact points with the components of the heat generating components of the multi-port network switch 140.

In some embodiments, the heatsink 435 may comprise a metal structure that couples with the lower chassis of the horizontal housing 120 to disperse the heat. In such embodiments, the lower chassis may also be formed from metal. Some embodiments may also include a fan (not shown) to create airflow across the heatsink to provide additional heat dissipation.

Figure 10:
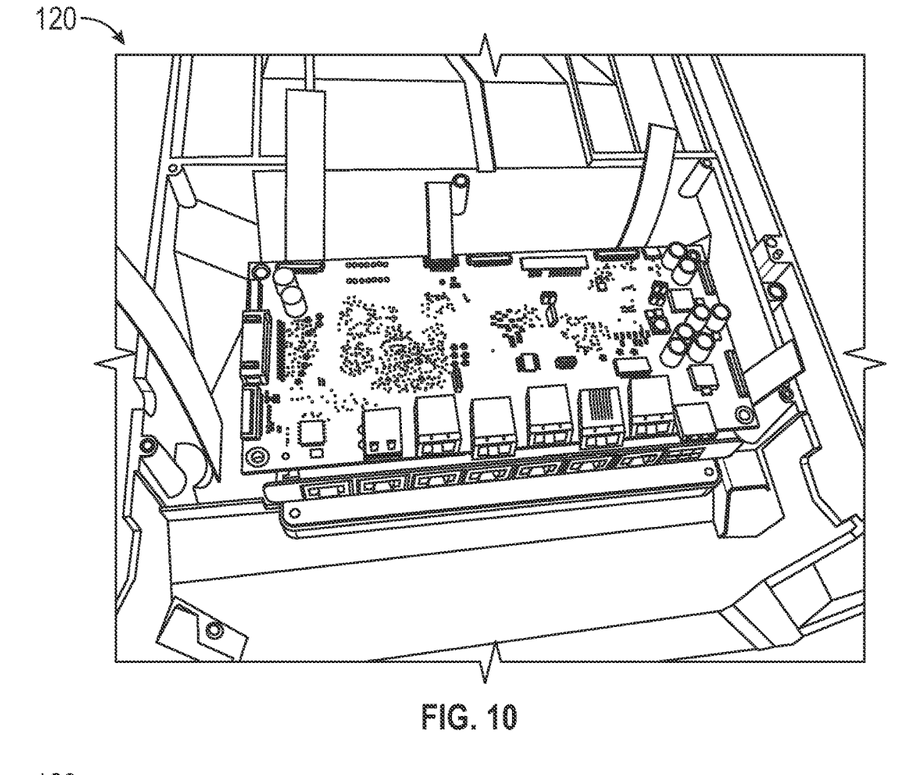
FIGS. 10 and 11 are images showing an example of the main board and the multi-port network switch secured to the horizontal housing in a stacked arrangement with the covers removed and with a cover secured in place of the stacked arrangement.
Figure 11:
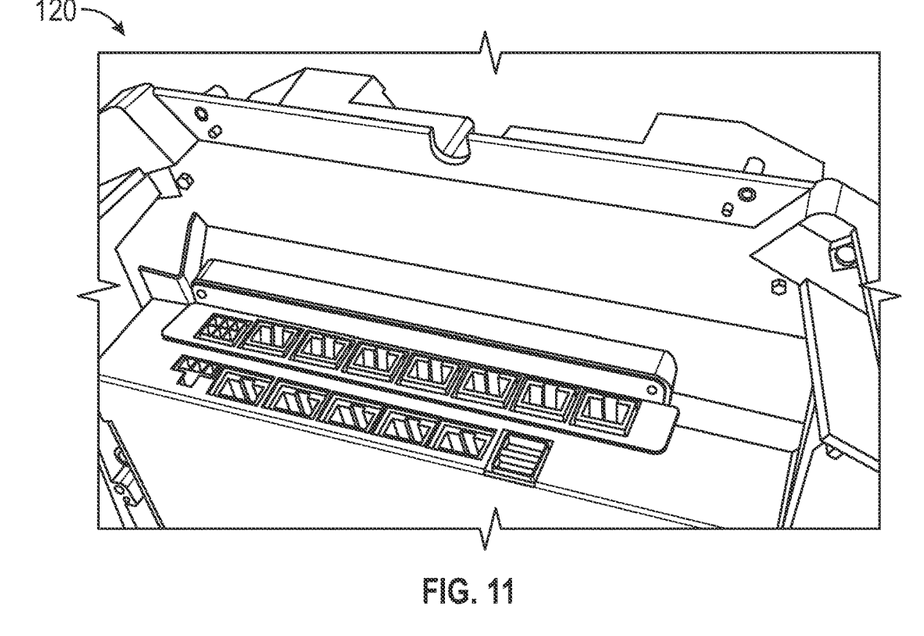

FIGS. 10 and 11 are images showing an example of the main board and the multi-port network switch secured to the horizontal housing 120 in a stacked arrangement with the covers removed (FIG. 10) and with a cover secured in place (FIG. 11) of the stacked arrangement of the main board and the separate board that supports the multi-port network switch. The stacked arrangement in FIGS. 10 and 11 shows the multi-port network switch on the bottom of the stack with the main board being on the top of the stack in contrast to the arrangement shown in FIG. 9 with the multi-port network switch on the top of the stack with the main board being on the bottom of the stack when disposed and mounted within the lower chassis of the horizontal housing. In either embodiment, a heatsink may be employed to provide heat management to one or both of the multi-port network switch or the main board.

The foregoing method descriptions and/or any process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be communicated (e.g., passed, forwarded, and/or transmitted) via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A fixed retail scanner including a data reader, comprising:
   a main board including one or more processors disposed within a housing of the data reader;
   one or more camera modules disposed within the housing of the data reader; and
   a multi-port network switch disposed within the housing of the data reader and operably coupled with the main board, wherein the multi-port network switch is configured to provide a network backbone for at least some internal devices within the data reader and for at least some external devices positioned external to the housing of the data reader and operably coupled with the data reader through the multi-port network switch, wherein the multi-port network switch is operably coupled to the main board via a single cable configured to provide power from a connected power source and communication to the main board.

2. The fixed retail scanner of claim 1, wherein the data reader is a bi-optic scanner with the housing including a horizontal housing and a vertical housing disposed in an orthogonal arrangement.

3. The fixed retail scanner of claim 2, wherein the multi-port network switch and the main board are disposed in a stacked arrangement within a void of the horizontal housing.

4. The fixed retail scanner of claim 3, further comprising a heatsink disposed in the stacked arrangement and thermally coupled with at least one of the multi-port network switch or the main board.

5. The fixed retail scanner of claim 1, further comprising a top-down reader operably coupled with the data reader through the multi-port network switch.

6. The fixed retail scanner of claim 1, wherein the multi-port network switch is an Ethernet-based network switch that provides an Ethernet backbone for the data reader.

7. The fixed retail scanner of claim 6, wherein the Ethernet-based network switch is further configured to couple to external devices from the data reader to provide control thereto and/or to communicate between the external devices and the data reader.

8. The fixed retail scanner of claim 7, wherein the external devices include at least one of:
   a remote backend server configured to perform analysis on images received from the multi-port network switch;
   a peripheral camera located remotely from the data reader; or
   a network enabled point-of-sale system.

9. A fixed retail scanner of including a data reader, comprising:
   a main board including one or more processors disposed within a housing of the data reader;
   one or more camera modules disposed within the housing of the data reader; and
   a multi-port network switch disposed within the housing of the data reader and operably coupled with the main board, wherein the multi-port network switch is configured to provide a network backbone for at least some internal devices within the data reader and for at least some external devices positioned external to the housing of the data reader and operably coupled with the data reader through the multi-port network switch, wherein the data reader is a bi-optic scanner with the housing including a horizontal housing and a vertical housing disposed in an orthogonal arrangement, and wherein the one of the multi-port network switch and the main board is disposed within the horizontal housing and the other of the multi-port network switch and the main board is disposed within the vertical housing.

10. A fixed retail scanner including a data reader, comprising:
- a main board including one or more processors disposed within a housing of the data reader;
- one or more camera modules disposed within the housing of the data reader; and
- a multi-port network switch disposed within the housing of the data reader and operably coupled with the main board, wherein the multi-port network switch is configured to provide a network backbone for at least some internal devices within the data reader and for at least some external devices positioned external to the housing of the data reader and operably coupled with the data reader through the multi-port network switch, wherein the data includes image data communicated from at least one imager internal to the data reader through the main board, from the main board to the multi-port network switch, and from the multi-port network switch to at least one external device.

11. The fixed retail scanner of claim 10, wherein the at least one imager is a monochrome imager.

12. A fixed retail scanner including a data reader, comprising:
- a main board including one or more processors disposed within a housing of the data reader;
- one or more camera modules disposed within the housing of the data reader; and
- a multi-port network switch disposed within the housing of the data reader and operably coupled with the main board, wherein the multi-port network switch is configured to provide a network backbone for at least some internal devices within the data reader and for at least some external devices positioned external to the housing of the data reader and operably coupled with the data reader through the multi-port network switch, wherein the data includes image data communicated from at least one imager internal to the data reader through the least one multi-port network device and on to at least one external device bypassing the main board.

13. The fixed retail scanner of claim 12, wherein the at least one imager is a color imager.

14. A data reading system, comprising:
- a bioptic scanner comprising:
  - a main board including one or more processors configured to perform decoding of barcodes; and
  - a multi-port network switch that is operably coupled to internal components including the main board and at least one camera disposed within the bioptic scanner;
- a remote server operably coupled to the bioptic scanner through the multi-port network switch,
- wherein the multi-port network switch is configured to communicate image data to the remote server via at least one of the main board or the at least one camera coupled to the multi-port network switch disposed within the bioptic scanner.

15. The data reading system of claim 14, wherein the bioptic scanner includes a first plurality of cameras operably coupled directly with the multi-port network switch, and a second plurality of cameras operably coupled directly with the main board.

16. The data reading system of claim 14, further comprising at least one peripheral camera operably coupled to the bioptic scanner through the multi-port network switch and configured to pass captured image data from the at least one peripheral camera to at least one of the main board or the remote server through the multi-port network switch.

17. The data reading system of claim 16, wherein the main board is configured to coordinate timing of internal cameras and internal illumination assemblies with any external cameras and external illumination assemblies operably coupled to the bioptic scanner through the multi-port network switch based on packet time stamps across the network connection.

18. A method of capturing images by a bioptic scanner in a retail environment, the method comprising:
- capturing first image data via a first camera disposed internally within the bioptic scanner and routing the first image data to at least one of a main board of the bioptic scanner or a remote server through a multi-port network switch disposed within the bioptic scanner that is operably coupled with the main board disposed within the bioptic scanner; and
- capturing second image data via a second camera disposed internally within the bioptic scanner and transmitting the second image data to the main board for barcode decoding by a decoder.

19. The method of claim 18, further comprising routing the first image data to the main board through the multi-port network switch.

20. The method of claim 18, further comprising routing the second image data to the remote server through both the main board and the multi-port network switch.

* * * * *